United States Patent [19]

Crary

[11] Patent Number: 5,832,307

[45] Date of Patent: Nov. 3, 1998

[54] SATELLITE COMMUNICATION SYSTEM OVERWRITING NOT VALIDATED MESSAGE STORED IN CIRCULAR BUFFER WITH NEW MESSAGE IN ACCORDANCE WITH ADDRESS STORED IN LAST VALID WRITE ADDRESS REGISTER

[75] Inventor: Philip D. Crary, Mission Viejo, Calif.

[73] Assignee: Hughes Electronics Corporation, Los Angeles, Calif.

[21] Appl. No.: 697,101

[22] Filed: Aug. 19, 1996

[51] Int. Cl.⁶ .................................................. G06F 13/00
[52] U.S. Cl. ........................ 395/872; 395/874; 711/133
[58] Field of Search ........................... 364/550; 370/391, 370/506, 320; 395/842, 872; 365/189.01; 711/133

[56] References Cited

U.S. PATENT DOCUMENTS

| 4,942,515 | 7/1990 | Marzucco et al. | 395/842 |
|---|---|---|---|
| 4,965,794 | 10/1990 | Smith | 370/506 |
| 5,206,817 | 4/1993 | McClure | 365/189.01 |
| 5,398,241 | 3/1995 | Witchey | 370/391 |
| 5,450,395 | 9/1995 | Hostetter et al. | 370/320 |

*Primary Examiner*—Le Hien Luu
*Attorney, Agent, or Firm*—Georgann S. Grunebach; M. W. Sales

[57] ABSTRACT

A system for storing and managing messages received at a satellite communications system is disclosed. Messages are sent from a plurality of transmission sources to the system. The message data is received at a plurality of interfaces that verify the accuracy of the data sent, store it in a plurality of RAMs, and then signal a processor that a new message is available for execution. The RAMs are each part of separate message buffers that keep track of the addresses of valid, stored messages and the addresses of the last messages read from memory.

17 Claims, 2 Drawing Sheets

SATELLITE COMMUNICATION SYSTEM OVERWRITING NOT VALIDATED MESSAGE STORED IN CIRCULAR BUFFER WITH NEW MESSAGE IN ACCORDANCE WITH ADDRESS STORED IN LAST VALID WRITE ADDRESS REGISTER

TECHNICAL FIELD

The present invention relates to a method and apparatus for storing messages received by a space qualified processor or control logic. More specifically, the present invention relates to a method and apparatus for receiving messages, and after determining their validity, storing the valid messages for distribution by a space qualified processor or control logic.

BACKGROUND ART

Prior methods and apparatus are known in the art for storing and validating (managing) messages in the memory of space qualified processors. This message management may require the use of a complex microprocessor based algorithm. The algorithm is complex because in order to manage messages on the processor, a significant amount of information about each message must be known by the processor and then processed by the algorithm.

For example, the processor must know where in its memory the messages are located and which messages are valid and which messages are invalid. Additionally, the software algorithm that is run by the processor must determine when a certain message can be accessed by the processor.

The determination of the above information by the algorithm requires the use of pointers to signify the location of the beginning and/or the end of each message, along with other storage information, including, how big or how many bytes each message takes up. Information regarding the sequence of messages, including which message precedes which message, and which message follows the other is also necessary. This information is important to ensure that the messages are executed by the processor in the appropriate order. Moreover, many prior systems did not adequately remove messages, which were deemed invalid upon arrival, from the memory. Thus, these prior systems could sometimes execute an invalid message.

The storage of this information takes up a lot of space on the processor, and because of the amount of information that must be processed by the algorithm, the processing speed or throughput in prior systems is very slow. This is particularly true in a system where the rate of messages being sent to the system is very high. In these systems with high message receipt rates, the memory management must also be executed or processed at a high rate.

For most space based systems, the microprocessors are not fast enough to handle this high rate of information in an efficient manner. Additionally, each time a message is received, the processor is interrupted as the algorithm in the processor must process the information regarding the message and store it before the processor can act on the message. This further decreases the operating speed at which the processor operates in a system where the rate of messages being sent is high.

SUMMARY OF THE INVENTION

It is therefore an object of the present invention to provide a method and apparatus for storing and managing received messages that will utilize less software and less processing time than prior art devices. For systems with slower message receipt rates, an algorithm for a dedicated processor function is disclosed. The algorithm is small and can be executed quickly.

For systems with faster message rates, it is an object of the present invention to implement the algorithm function in hardware components. This hardware approach frees-up the microprocessor to do more complex tasks. With either system, the memory management that is required to store and execute the messages is greatly simplified. By implementing the algorithm in hardware, the present invention saves the cost of software development, the cost of spacecraft weight (as a result of fewer processor slices), spacecraft power, and test complexity.

In accordance with the objects of the present invention, a system for storing and executing messages received at a satellite communications system is provided. The system includes a space qualified microprocessor, with a plurality of source interfaces, a plurality of message buffers, a plurality of write counters, a plurality of read counters, a plurality of monitoring registers, and a plurality of RAMs. Each of the plurality of source interfaces is adapted to receive serial data from various transmission sources and then transfer the data to a respective one of the message buffers. The serial data is representative of various messages that instruct the processor to perform a specific function or application.

Just prior to receiving the data from a transmission source, the interface receives a signal indicating that a new message is being transferred. The data is then transmitted byte by byte through the interface to a message buffer and written into a RAM. After all the data has been transmitted and written into a RAM, the transmission source will signal the interface that the entire message has been sent. The interface then performs a validation check on the message to ensure that it was properly transmitted and received. If validation succeeds, the interface signals the buffer; if validation fails, the interface does not signal the buffer.

In the message buffer, if the message has been properly received and the interface has validated the message, a write counter, which is in electrical connection with the RAM, will record the address in the RAM in which the last byte of the new message is stored. A read counter is also included which records the address of the first byte of the next message that can be read out of the RAM by the processor. The apparatus and method thus allows for storage and verification of new messages prior to any action by the microprocessor.

For each message buffer, a separate register tracks each RAM and compares the last address into which validated message data was written, and the last address from which data was read by the processor. If the register indicates that the last address for one of the RAMs into which the validated data was written, is not the same as the last address from which data was read, then a new message exists. When it is determined that a new message exists, a "message waiting" signal is transmitted to the processor indicating the existence of a new message for the processor to retrieve. This signal remains asserted until the processor has retrieved all bytes of the message.

Additional features and advantages of the present invention will become apparent to one of skill in the art upon consideration of the following detailed description of the present invention and the drawings.

BRIEF DESCRIPTION OF THE DRAWINGS

A preferred embodiment of the present invention is described by reference to the following drawings.

DESCRIPTION OF THE PREFERRED EMBODIMENTS

Figure 1:
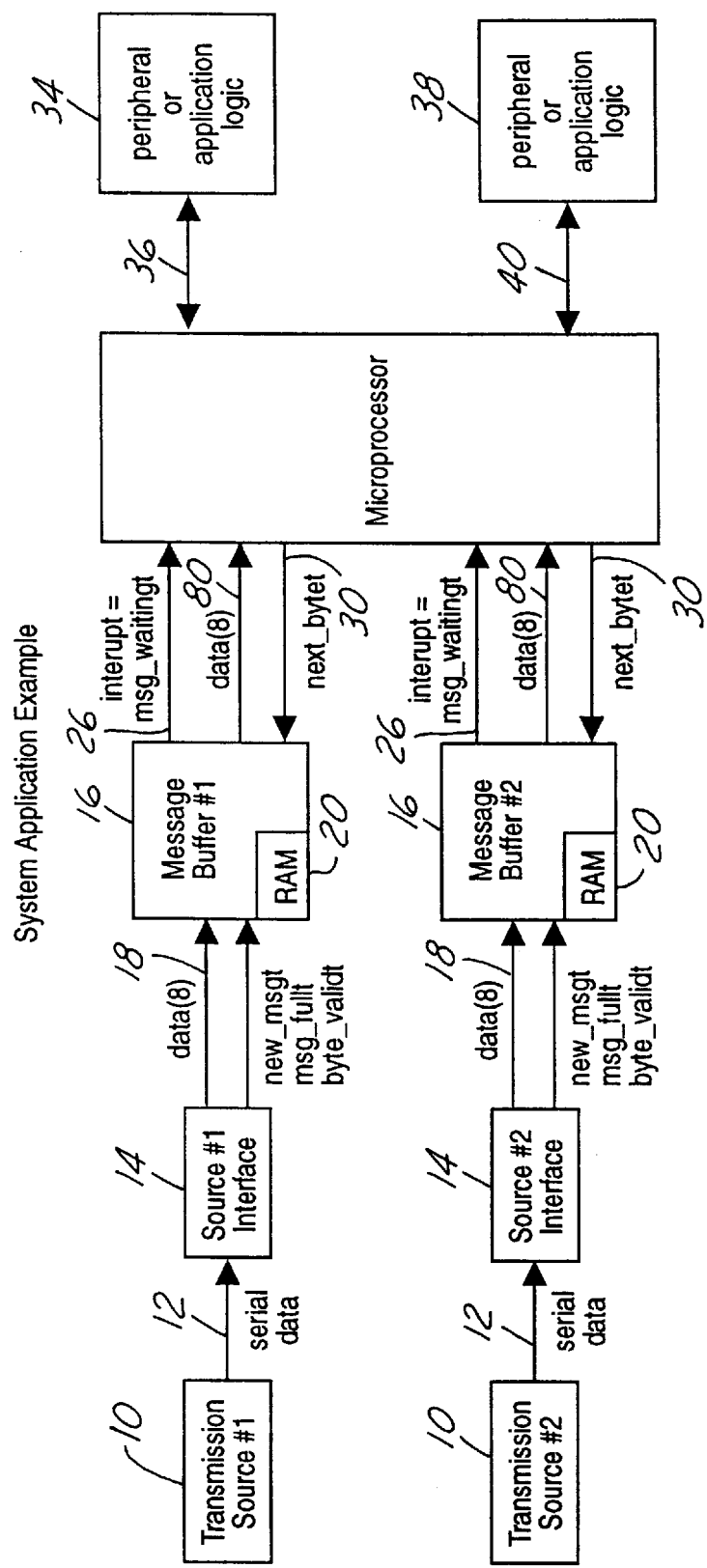
FIG. 1 is a schematic block diagram illustrating the operation of a preferred embodiment of the message storage system in accordance with a preferred embodiment of the present invention.

FIG. 1 schematically illustrates an example of the operation of the preferred embodiment of the circular message buffer of the present invention. A plurality of transmission sources, designated 10, transmit serial data comprising messages for execution by the processor, or information about the messages, along data lines 12. The serial data is received at a plurality of source interfaces 14 through the data lines 12.

The source interface 14 that receives serial data from a transmission source 10 then passes it along line 18 to a message buffer 16 associated with the source interface. The data is then written into a RAM 20 associated with a respective one of the message buffers 16. In the preferred embodiment, 8 separate RAMs are present. However, more or less RAMs may be used depending upon the requirements of the system. The source interfaces 14 also receive and process information regarding the status of the messages they receive. For example, this information could include whether a new message is being transmitted, whether the entire message has been sent, and/or whether a byte has been received.

The serial data and the information about the serial data are transmitted to the message buffer 16 associated with that interface 14, as is described in more detail below. Each message buffer 16 includes a RAM 20 into which the messages transmitted from the transmission source 10 are stored. If the message written into the RAM 20 is ultimately determined to be valid, i.e. received without any errors, a register 48 (FIG. 2) is updated, as will be discussed below, and a signal 26 is transmitted to a microprocessor 28 that indicates a message is waiting. The microprocessor 28 then queries the message buffer 16, on which the message is stored, for the message information via a signal 30. The data constituting the new message is then transmitted to the microprocessor 28 via the data line 80. By this method, the memory, and thus the task of storing of messages, is interfaced to the hardware logic and not to the processor 28 itself. The only time the processor 28 is interrupted is when a valid message is stored in memory (RAM 20) and requires action.

If a message stored on the RAM 20 is not validated, the last valid write address register 48 is not updated to reflect the storage of that message in memory (RAM 20). This results in invalid messages being overwritten by the next message received in RAM 20. The validation process is performed by the source interface 14 hardware and can be any known validation method. The preferred validation process or error detection method is one called Cyclic Redundancy Check (CRC). This process, like other similar processes, operates by sending an error detection word in a trailer at the end of the new message that is sent to the interface 14. The information contained in the trailer at the end of each message includes information to check the accuracy of the data sent. If the CRC generated from the new data received doesn't match the CRC in the trailer, the message will not be validated. The error detection method may also operate in other ways. For example, the error detection method may count the number of words or the number of bytes.

Once the microprocessor 28 receives the information, it will take the message data and either execute it itself, or route it to the proper location for execution of the message. For example, as shown in FIG. 1, the message can be routed by the microprocessor 28 to a peripheral 34 by line 36 or to another peripheral 38 by line 40 depending on the content of the message.

Figure 2:
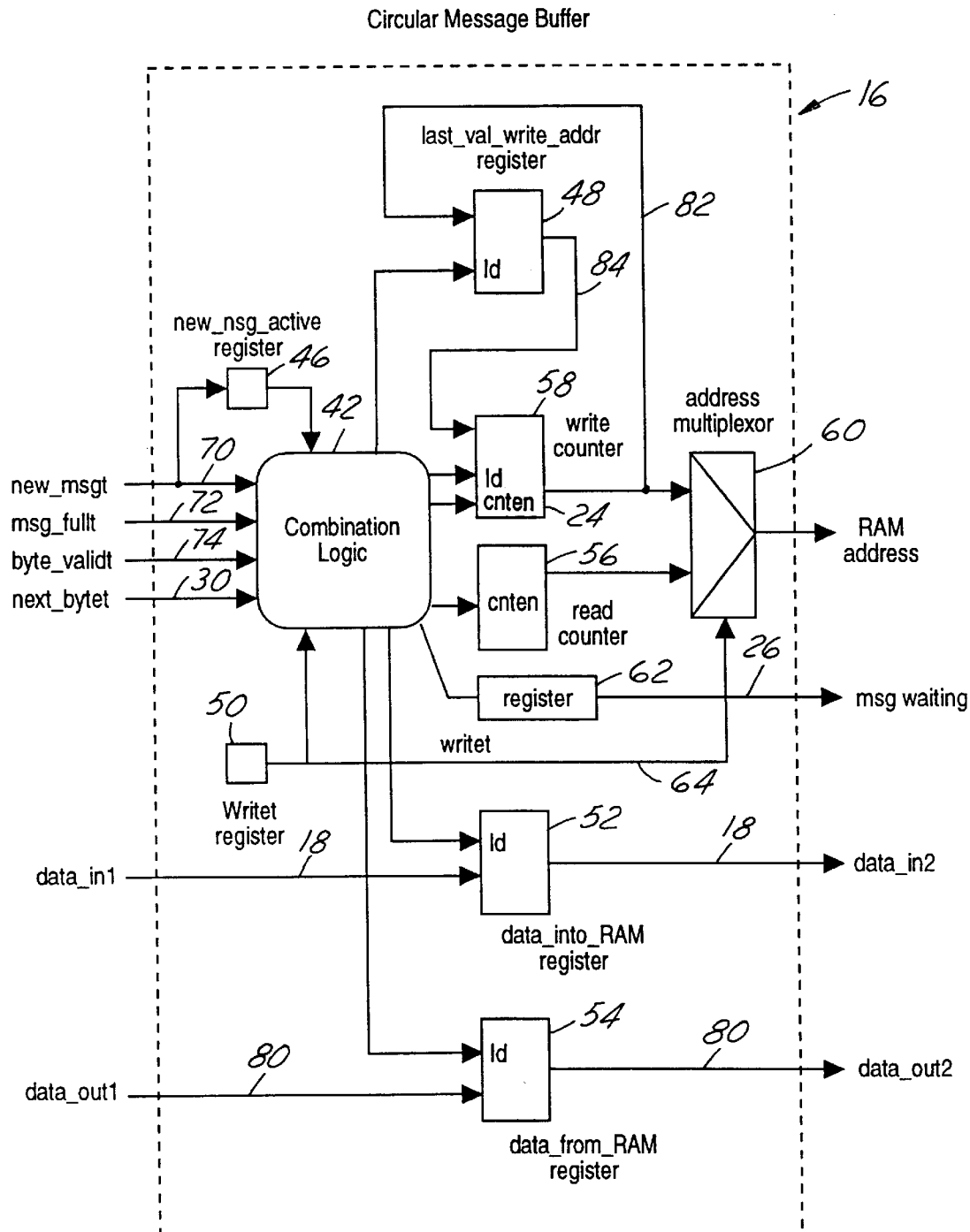
FIG. 2 is a schematic block diagram illustrating the hardware associated with the circular message buffer in accordance with a preferred embodiment of the present invention.

Turning now to FIG. 2, which illustrates the operation of the preferred circular message buffer 16 in more detail. In the preferred embodiment, the circular message buffer 16 is interfaced to a larger space qualified processor and includes a logic controller 42 that coordinates the receipt of the new message data from the interface 14 via line 18, a new message active register 46, a last valid write address register 48, a writet register 50, a data into RAM register 52, a data out of RAM register 54, a read counter 56, a write counter 58, an address multiplexer 60, and a message waiting register 62.

In operation, of the preferred embodiment, where the algorithm is implemented in hardware to receive and process messages, the processor 28, whether a microprocessor or implemented in the hardware, has a read interface to each of the RAM 20. All interface control signals between the processor 28 and the algorithm hardware change on the falling edge of a writet signal 64, which is simply the system clock divided by two and which is controlled by the writet register 50. This writet signal 64 allows writes to be performed at rates up to every other system clock, and allows for reads when writes are not enabled.

When a new message signal 70 is transferred to the logic controller 42 in the message buffer, the new message active register 46 is asserted. This register 48 retains this value until either the current message is validated, or another new message signal 70 arrives. The new message active register tells the logic controller 42 that a new message is still incoming. The writet register 50 is also in communication with the logic controller 42 and acts as a toggle to control the write and read processes. When the writet register 50 toggles its input to the logic controller to write, it enables any accumulated 8 bits (1 byte) of incoming data to be written into one of the RAMs 20 during the write phase. The writet register 50 then toggles and switches the logic controller 42 to the read phase to enable the processor 28 to read a byte of the validated message data out of the RAM 20. All read control signals from the processor 28 are asserted for two system clocks to ensure they are applied for a read phase.

The interface to write to the message buffer 16 includes a set of three control lines, the new message signal 70, a message full signal 72, and a byte valid signal 74 and the 8 bit data signal 18. An interface from the message buffer 16 to the microprocessor 28 includes a set of two control lines, the message waiting signal 26 and the next byte signal 30 from the processor 28, and an 8 bit data signal 80 from the message buffer.

Now turning to the write process. First, the new message control signal 70 is asserted from the source interface 16 two clocks before the first byte of data is sent. With each of the bytes of data sent via line 18 to the message buffer 16, the control signal byte valid 74 is sent. The data received via line 18 is then written into the RAM 20 associated with that circular buffer 16.

Once the message has been received and validated, the full message signal 72 is sent to indicate that the message has been sent. Once the full message signal 72 is sent and the validated message is stored in the RAM 20, the "last valid write" register is updated to reflect the last address of the RAM 20 into which the new message was stored.

If a given message is determined to be invalid, the message full signal 72 is not sent by the interface 14 to the message buffer 16. In this case, the "last valid write" register is not updated and retains the address where the "invalid message" began. Then, when the next message arrives, the "last valid write" address is loaded into the write address counter 58, and the previous invalid message is overwritten as the new message arrives. Because of the circular nature of the buffer 16, when messages have been written into the end of memory (RAM 20), the algorithm assumes that the processor 28 is running fast enough and the memory size sufficient to have cleared some of the validated messages from the memory and new messages will thus be written into the beginning of the memory. Thus, when the memory wraps around on itself, no valid messages should have been overwritten.

Once a message has been validated and is ready to be read, the address register 48 is updated to reflect the last address of the RAM 20 into which the new message was stored. The fact that the current read address in the read counter 56, is now different than the "last valid write" address in the "last valid write" address register 48, asserts the message waiting signal 26 to the microprocessor 28. When the message is able to be processed and read out of RAM 20, the first byte then on the RAM output data line 80, as indicated by the first address in the read counter 56, is read and the next byte signal 30 is pulsed by the microprocessor 28 as many times as needed until the message waiting signal 26 is deasserted.

When the message waiting signal 26 is asserted, the read counter 56 indicates the address of the next byte to be read out of the RAM 20 by the processor 28, and from this address any new messages are then read out. The register 62 contains the result of a comparison between the address of the last location to which a validated byte has been written, as indicated by the last valid write register 48, and the last address from which information has been read, as indicated by the read counter 56. When the last validated location to which a message has been written is not equal to the next location from which a message can be read, the message waiting signal 26 is asserted, setting a flag register in the processor 28.

As discussed above, as the new message is being written to a RAM 20, the address of the write counter 58 is updated each time, but the last valid write address register is not updated. Thus, the read counter 56 and the last valid write address register 48 are still equal and the message waiting signal 26 is not asserted. When the message is finally validated, via an assertion of the message full signal 72, the last valid write register 48 gets loaded with the current value of the write counter 58, via signal 82 and the message waiting signal 26 is thus asserted. If the message full signal 72 is not asserted, before the arrival of the next new message signal assertion, the contents of the last valid write address register 48 are re-loaded into the write counter 58, via line 84.

Regarding the read process, each time the next byte signal 30 is asserted, the read counter 56 is incremented and the data is loaded into the processor 28 by signal 80. Eventually, the read counter 56 will catch up with the last valid write address register 48 such that the read counter 56 and last valid write register will be equal and the message waiting signal 26 will be deasserted.

In another preferred embodiment not shown, this algorithm can also be implemented in software. This embodiment also requires validation of the message information prior to interrupting the microprocessor. This will still free up a significant portion of the CPU's throughput and simplify the message memory management, as compared to previous algorithms. This will save hardware costs and provide extra flexibility and is well suited for systems with lower message receipt rates.

While only one preferred embodiment of the invention has been described hereinabove, those of ordinary skill in the art will recognize that this embodiment may be modified and altered without departing from the central spirit and scope of the invention. Thus, the embodiment described hereinabove is to be considered in all respects as illustrative and not restrictive, the scope of the invention being indicated by the appended claims, rather than by the foregoing descriptions, and all changes which come within the meaning and range of equivalency of the claims are intended to be embraced herein.

What is claimed is:

1. A system for storing and executing messages received at a satellite communication system, comprising:

a plurality of source interfaces for receiving said messages transmitted to said system from a plurality of transmission sources;

a plurality of message buffers each in communication with a respective one of said interfaces for receiving and validating said messages;

last valid write register for tracking the address of the last valid byte of said validated messages that are stored in one of a plurality of RAMS;

a read counter for tracking the address of the last byte read from one of said plurality of RAMS; and a register for tracking said last valid write register and said read counter whereby if said address of said last valid write is not equal to said address of said read counter, a message waiting signal will be sent to a processor to indicate that a new message is stored in one of said plurality of RAMS whereby said message is transferred to said processor for execution, and if a message is not validated, said last valid write register will equal said address of said read counter and any new messages transferred to one of said plurality of source interfaces will overwrite said not validated messages.

2. The system for storing and executing messages of claim 1, wherein said messages are validated using cyclic redundancy check.

3. The system for storing and executing messages of claim 1, wherein said last valid write address register is only updated after said message data is validated.

4. The system for storing and executing messages of claim 1, wherein each of said plurality of RAMs has a data into RAM register associated therewith that holds the data that is written into each RAM.

5. The system for storing and executing messages of claim 1, wherein each of said plurality of RAMs has a data out of RAM register associated therewith that holds the data that is read out of each RAM.

6. The system for storing and executing messages of claim 1, further comprising a writet register that sends a writet signal that toggles the system between a write mode and a read mode.

7. The system for storing and executing messages of claim 6, wherein said writet signal is the system clock divided by two.

8. The system for storing and executing messages of claim 7, wherein each of said message buffers includes a logic controller for receiving a plurality of write control signals from a respective one of said interfaces.

9. The system for storing and executing messages of claim 8, wherein said write control signals include a new message signal, a message full signal, and a byte valid signal.

10. The system for storing and executing messages of claim 9, wherein said write control signals are asserted for two system clocks.

11. The system for storing and executing messages of claim 6, wherein each of said message buffers includes a logic controller for receiving at least one read control signal from said processor.

12. The system for storing and executing messages of claim 11, wherein said read control signal includes a next byte signal which is asserted by said processor until said message waiting signal is deasserted.

13. A circular message buffer for storing received messages comprising:
  a logic controller for receiving write control signals from a source interface;
  a storage medium for storing message data received from said source interface and wherein said logic controller validates the accuracy of said message data and if said message is not validated by said logic controller, said last valid write address register is not updated and said message stored in said storage medium will be overwritten when a new message is received at said chamber message buffers;
  a last valid write address register for storing the address of the last address of a valid message stored in said storage medium;
  write counter for tracking the address of said message data stored in said storage medium and in communication with said last valid write address register to indicate if said message has been validated by said logic controller;
  a read counter for tracking the address of the last address of a valid message read from said storage medium; and
  a compare register for comparing the address in said last valid write address to the address in said read counter and then sending a message waiting signal to a processor if said addresses are not equal.

14. The circular message buffer of claim 13, wherein said write control signals include a new message signal, a message full signal, and a byte valid signal.

15. The circular message buffer of claim 13, wherein said storage medium is a RAM.

16. The circular message buffer of claim 13, wherein said circular message buffer is part of a satellite communications system.

17. A method of storing and executing messages received at a satellite communications system, comprising the steps of:
  receiving a signal at an interface associated with said system that a new message is incoming;
  sending bytes of data representative of said new message to said interface;
  writing said new message data into a storage medium;
  updating the address of a write counter to reflect the location of said new write counter message data said storage medium;
  checking said new message data to ensure that said bytes of data were properly received;
  updating the address of a last valid write address register if said message data is validated;
  providing a read counter with an address of the last byte read out;
  sending a new message signal to a microprocessor representative of a waiting message if said address of said new message in said write counter is not equal to said address in said read counter;
  overwriting said new message data with subsequent messages if said bytes of data were not properly received; and
  reading said data from said storage medium into said processor in response to said message waiting signal.

* * * * *